United States Patent
Shorr et al.

[15] 3,657,057
[45] Apr. 18, 1972

[54] LAMINATED WINDOWS

[72] Inventors: Norman Shorr, Pittsburgh; Harry E. Littell, Jr., Allison Park, both of Pa.

[73] Assignee: PPG Industries, Inc., Pittsburgh, Pa.

[22] Filed: June 17, 1969

[21] Appl. No.: 834,037

[52] U.S. Cl. ................161/2, 156/99, 156/308, 156/331, 161/183, 161/190, 161/199, 161/408
[51] Int. Cl. ..................B32b 17/10, B32b 27/40
[58] Field of Search .........161/190, 183, 199, 182, 408–410; 156/308, 99, 100, 102, 331

[56] References Cited

UNITED STATES PATENTS

| | | | |
|---|---|---|---|
| 2,713,884 | 7/1955 | Schwartz | 152/330 |
| 3,193,441 | 7/1965 | Schafer | 161/190 X |
| 3,388,032 | 6/1968 | Saunders | 161/190 X |
| 3,388,034 | 6/1968 | McCombie | 161/199 X |
| 3,406,086 | 10/1968 | Foster | 161/199 X |
| 3,088,934 | 5/1963 | Bonanni | 156/331 X |
| 3,520,768 | 7/1970 | Peilstocker | 161/183 X |
| 3,522,142 | 7/1970 | Wismer et al. | 161/190 |
| 3,578,552 | 5/1971 | Prevorsek et al. | 161/183 |
| 3,580,796 | 5/1971 | Hick et al. | 156/99 X |

*Primary Examiner*—Harold Ansher
*Attorney*—Chisholm and Spencer

[57] ABSTRACT

Improving the adhesion of a cured sheet of polyurethane to a rigid transparent sheet, such as glass or polycarbonate, by interposing a polymerizable polyurethane resin between the cured polyurethane sheet and the rigid transparent sheet prior to lamination.

12 Claims, 1 Drawing Figure

PATENTED APR 18 1972
3,657,057
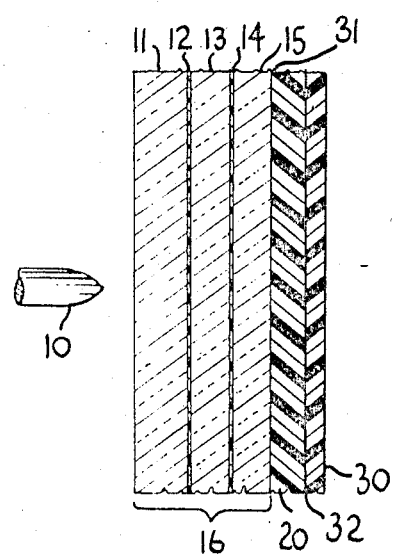
INVENTORS
NORMAN SHORR
HARRY E. LITTELL JR.
BY
ATTORNEYS

LAMINATED WINDOWS

This invention relates to laminated windows and particularly to windows having cured polyurethane in sheet form as an interlayer. Polyurethane formed by reacting an organic polyisocyanate with a polyol forms a high viscosity liquid which is cast between two rigid transparent sheets and cured in place to form a laminate. Such casting is a very sensitive operation, and, unless it is accomplished under conditions where the temperature, rate of flow and other parameters are carefully controlled, the resulting interlayer develops striations which impair the optical properties of the laminate.

It has been proposed to avoid the problem of critical control incidental to casting by forming a sheet of cured polyurethane and laminating said sheet between a pair of rigid, transparent sheets of glass and/or polycarbonate plastic and the like in a manner similar to that employed with laminating plasticized polyvinyl butyral to glass. Unfortunately, polyurethane sheets which readily adhere to glass have free isocyanate groups (—NCO) which react with moisture to form carbon dioxide and polyureas with a great deal of bubbling. These reaction products adversely affect the optical properties of a polycarbonate sheet when laminated to the latter. Even fully cured polyurethanes absorb moisture, which weakens the adhesion between the polyurethane layer and adjacent layers of glass or polycarbonate. Therefore, steps must be taken to produce and store polyurethane sheet in a dry atmosphere until the sheet is protected by being embedded within a laminate. This is impractical for a commercial operation because of the high cost of air conditioning the storage area for polyurethane sheeting. Another technique to avoid absorption of moisture is to react the free isocyanate linkages with a chemical that reacts with isocyanate, such as an acrylic, to block any isocyanate reaction with moisture. Any success obtained from using this latter technique also causes the treated sheets to have poor adhesion.

Various polyurethane compositions are disclosed in Canadian Pat. No. 673,678 to Vernon G. Ammons, Michael E. Dufala and Marco Wismer as interlayers of a safety glass laminate. These patented compositions generally comprise a reaction product of a poly(tetramethylene oxide) glycol having an average molecular weight of from about 550 to about 1,800, a diisocyanate and a curing agent comprising a polyol containing at least three hydroxyl groups and a diol. The composition is maintained at an elevated temperature for a time sufficient for curing. Generally, the time needed for curing decreases as the temperature of treatment increases.

The polyurethanes suitable for casting in place and curing in a cell formed between two rigid sheets are prepared first by forming an isocyanate terminated prepolymer from the interaction of a diisocyanate and a poly(tetramethylene oxide) glycol. This prepolymer forms one package of a two-package system, the curing system comprising the polyol and the diol comprising the other package. While resinous compositions made from poly(tetramethylene oxide) glycols falling out of the above-mentioned molecular weight range have good optical transparency and have good adhesion to glass, they cannot be used to make commercially acceptable safety glass because of poor impact energy absorption level at either low or high temperatures. If the poly(tetramethylene oxide) glycol has a molecular weight below 550, the resinous compositions become too brittle at low temperatures, and if the poly(tetramethylene oxide) glycol has a molecular weight above 1,800, the resinous compositions lack rigidity at high temperatures so that insufficient impact resistance is attained.

The poly(tetramethylene oxide) glycols are obtained commercially in the form of a "prepolymer", which is a reaction product of the said glycol, with a diisocyanate. The Adiprene series, which is a trade name for poly(tetramethylene oxide) glycol-toluene diisocyanate prepolymers, is one source which has proved to be particularly useful in making the present safety glass interlayers. The properties which make these resinous compositions especially desirable to be used as an interlayer for safety glass are obtained from the straight chain poly(tetramethylene oxide) glycols which fall within the said molecular weight range. In other words, the single most important factor in making the resinous interlayer compositions capable of casting and curing between glass sheets is the critical molecular weight range of poly(tetramethylene oxide) glycol.

In the formation of the prepolymer, it is preferred that toluene diisocyanate be used because it is easily obtained commercially and because of its low cost. As far as operability is concerned, however, any of a wide variety of organic diisocyanates may be employed in the reaction, including aromatic, aliphatic and cycloaliphatic diisocyanates and combinations of these types. Representative compounds include m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-(cyclohexyl isocyanate) and 1,5-tetrahydronaphthylene diisocyanate. Arylene diisocyanates, i.e., those in which each of the two isocyanate groups is attached directly to an aromatic ring, are preferred. The sterically hindered types such as 3,5-diethyl-methylene-bis-(4-phenylene isocyanate) and o,o'-diethyl-para-benzene diisocyanate, in which the two isocyanate groups differ greatly in reactivity, are also of interest. The diisocyanates may contain other substituents which do not react with isocyanate groups. In the case of the aromatic compounds, the isocyanate groups may be attached either to the same or to different rings. Dimers of the monomeric diisocyanates and di(isocyanatoaryl) ureas such as di-(3-isocyanato-4-methyl-phenyl) urea may be used.

The curing systems for the polyurethane resins comprise a polyol which functions as a cross-linking agent and may also include a diol which functions as a chain extender, if such function is desired.

Any one of a wide variety of diols are operative as a chain extender, for example, the lower molecular weight glycols, such as ethylene, propylene, butylene, pentylene, and the higher or substituted alkylene diols, and the various hydroxyl-substituted aryl compounds. Particularly useful are 1,4-butanediol, 2,2-bis(4-hydroxy-cyclohexane)propane, 1,5-pentanediol, and 2-methyl-2-n-propyl-1,3-propanediol.

The polyols which are to be employed as cross-linking agents must have three or more labile hydrogen atoms per molecule and as a prerequisite must be compatible with the reaction system, i.e., they must be soluble in the reaction mass. Theoretically, there is no real limit as to the number of hydroxyl groups per molecule. As a practical matter, however, the size of the molecule would ultimately affect the properties such as solubility, etc., and therefore preclude the use thereof.

Polyols having up to eight and even 10 hydroxyl groups per molecule have been proved to be operative. Examples of the more common polyols which may be employed include trimethylol propane, trimethylol heptane, trimethylol ethane, sorbitol, castor oil, the reaction products of allyl alcohol with styrene and the reaction products of the various polyols with alkylene oxides.

In order to obtain optimum results, the curing system is used in amounts so that the sum total of the labile hydrogen atoms is approximately stoichiometrically equal to the free isocyanate groups of the prepolymer. Operative results, however, are accomplished when this amount is varied within 5 percent above the stoichiometric point or varied within 10 percent below the stoichiometric point, and preferably within 3 percent of stoichiometry. In order to obtain the optimum results with the various molecular weights within the above-mentioned range, certain diol-polyol ratios must be employed, for example, about 3.5 equivalents of diol to 1 equivalent of polyol should be used with the high molecular weights (1,250 to 1,800), and about 6 equivalents of diol to 1 equivalent of polyol with the lower intermediate molecular weights (650 to 850), and about 9 equivalents of diol to 1 equivalent of polyol with the lower molecular weights (about 550 to 650). It is possible to make operative resinous interlayer compositions with ratios of diol to polyol ranging from 1.5:1 to 10:1.

When operating at the extremes of the molecular weight range of poly(tetramethylene oxide) glycol, it is possible to alter physical properties to a certain extent by employing a diol which imparts plasticizing properties to the final polymer or those which impart rigidity to the final polymer, straight chain poly(butylene oxide) glycol being an example of the former and 2,2-bis(4-hydroxy-cyclohexane) propane being an example of the latter.

The resinous interlayer is prepared simply by first heating the "prepolymer" to about 212° F. and placing it under a vacuum for about 1 – 2 hours. The "prepolymer" is then mixed with the polyol-diol curing system in a suitable vessel. The mixture is then maintained at a temperature range from about 150° F. to about 200° F. under a vacuum in order to remove any gases which are present or which were entrained during the mixing and produce a viscous liquid (A stage). Added heating, for example, added curing for 6 hours at 285° F. followed by extrusion produces C stage polymerized sheets having all the properties required of an interlayer for a glass-plastic laminate except for suitable adhesion to rigid materials such as glass and polycarbonates. The added curing may be accelerated by performing the step at a higher temperature, and may be completed at lower temperatures if a longer time for the cure can be accepted. Adequately cured sheets do not absorb moisture, but have poor adhesion properties.

While the terms A stage, B stage and C stage have acquired a meaning in the art, they are being defined herein to improve the clarity of the present description. A stage refers to a polymerizable, catalyzed, thermosetting plastic material, preferably in the liquid state. C stage refers to a fully polymerized thermosetting plastic material and B stage refers to a thermosetting plastic material that is solid and appears to be fully polymerized, but is only partially polymerized as evidenced by its ability to flow and creep under application of heat, whereas the C stage material carbonizes on application of heat. Both B stage and C stage plastics are solid in appearance.

The present invention is particularly suited for use in improving the adhesion between different portions of bullet-resisting glass panels. A typical multiplate laminated bullet-resisting glass panel comprises an impact striking portion comprising alternating plies of glass (which may be annealed, heat-strengthened or chemically tempered) and plastic, an impact transition portion comprising cast-in-place polyurethane and an impact absorption portion comprising a layer of polycarbonate. The impact transition portion is arranged behind the impact striking portion and in front of the impact absorption portion of the laminated panel.

In multiplate glass laminates wherein a layer of plasticized polyurethane sheet material serves as the impact transition portion and a polycarbonate sheet serves as the impact absorption portion, poor adhesion between the polyurethane layer and the innermost glass sheet of the impact striking portion on the one hand and poor adhesion between the polyurethane layer and the polycarbonate sheet, on the other hand, cause the portion of the laminate opposite the impacted surface to be blown off during ballistic tests. The present invention provides a simple, yet effective, method of curing this defect that will be explained later.

The glass used in the impact striking portion may be tempered, and the tempering may be chemical in nature, such as provided by the ion exchange technique of U.S. Pat. No. 3,218,220 to Neill Weber. The plastic in the impact striking portion is preferably plasticized polyvinyl butyral having a lower plasticizer content and a low moisture content.

Polyvinyl butyral is formed by reacting butyraldehyde with polyvinyl alcohol. The alcohol groups left unreacted are calculated as the percent vinyl alcohol remaining in the polymer. Present-day safety-glass laminates are made using an interlayer whose base resin is composed of a polyvinyl alcohol partially condensed with butyraldehyde so that it contains from 15 percent to 30 percent of unreacted hydroxyl groups calculated as weight percent of vinyl alcohol, less than 3 percent by weight of ester groups calculated as weight percent of vinyl acetate and the remainder of acetal groups calculated as vinyl butyral. This material is commonly called "polyvinyl butyral" or more exactly "partial polyvinyl butyral." Conventionally, polyvinyl butyral, as used in safety-glass laminates, contains a plasticizer.

Generally, the plasticizers used are water-insoluble esters of a polybasic acid or a polyhydric alcohol. Particularly desirable plasticizers for use in the present invention are triethylene glycol di(2-ethyl-butyrate), dibutyl sebacate, di(beta-butoxy-ethyl) adipate, and dioctyl phthalate. Other suitable plasticizers include triethylene glycol fully esterified with a mixture of 80 – 90 percent caprylic acid and 10 – 20 percent capric acid as described in U.S. Pat. No. 2,372,522, dimethyl phthalate, dibutyl phthalate, di(butoxyethyl) sebacate, methyl palmitate, methoxyethyl palmitate, triethylene glycol dibutyrate, triethylene glycol diacetate, tricresyl phosphate, triethyl citrate, butyl butyryl lactate, ethyl para-toluene sulfonamide, dibutyl sulfone, lauryl alcohol, oleyl alcohol, glycerol triricinoleate, methyl lauroyl glycolate, butyl octanoyl glycolate and butyl laurate. The above list of plasticizers does not represent all the known plasticizers which can be used. Such a list would be impractical and would serve no purpose since one skilled in the art can readily select a plasticizer from the many already known. It has been found preferably to use less than 25 parts of triethylene glycol di(2-ethyl-butyrate) plasticizer for every 100 parts by weight of polyvinyl butyral for the impact striking portion 16.

The polycarbonate may be any suitable sheet of polycarbonate, such as that disclosed in U.S. Pat. Nos. 3,028,365 and 3,117,019, and is preferably prepared by reacting di(monohydroxyaryl) alkanes with derivatives of the carbonic acid such as phosgene and bischloro-carbonic acid esters of di(monohydroxyaryl) alkanes.

The aryl residues of the di(monohydroxyaryl) alkanes can be alike or different. The aryl residues can also carry substituents which are not capable of reacting in the conversion into polycarbonates, such as halogen atoms or alkyl groups, for example, the methyl, ethyl, propyl, or tert. butyl group. The alkyl residue of the di(monohydroxyaryl) alkanes linking the two benzene rings can be an open chain or a cycloaliphatic ring and may be substituted, if desired, for example by an aryl residue.

Suitable di(monohydroxyaryl) alkanes are, for example, (4,4'-dihydroxy-diphenyl) methane, 2,2-(4,4'-dihydroxy-diphenyl) propane, 1,1-(4,4'-dihydroxy-diphenyl) cyclohexane, 1,1-(4,4'-dihydroxy-3,3'-dimethyl-diphenyl) cyclohexane, 1,1-(2,2'-dihydroxy-4,4'-dimethyl-diphenyl) butane. (boiling point: 185–188° C. under 0.5 mm. mercury gauge), 2,2(2,2'dihydroxy-4,4'-di-tert-butyl-diphenyl) propane or 1,1'-(4,4'-dihydroxy-diphenyl)-1-phenyl ethane; furthermore, methane derivatives which carry beside two hydroxyaryl groups an alkyl residue with at least two carbon atoms and a second alkyl residue with one or more carbon atoms such as 2,2-(4,4'-dihydroxy-diphenyl) butane, 2,2-(4,4'-dihydroxydiphenyl) pentane (melting point 149°–150° C.), 3,3-(4,4'-dihydroxy-diphenyl) hexane, 3,3-(4,4'-dihydroxy-diphenyl) hexane, 2,2-(4,4'-dihydroxy-diphenyl)-4-methyl pentane (melting point 151°–152° C.), 2,2-(4,4'-dihydroxy-diphenyl) heptane (boiling point 198°–200° C. under 0.33 mm. mercury gauge), 4,4-(4,4'-dihydroxy-diphenyl) heptane (melting point 148°–149° C.), or 2,2-(4,4'-dihydroxy-diphenyl) tridecane. Suitable di(monohydroxyaryl) alkanes the two aryl residues of which are different are, for example, 2,2-(4,4'-dihydroxy-3'-methyl-diphenyl) propane and 2,2-(4,4'-dihydroxy-3-methyl-3'-isopropyl-diphenyl) butane. Suitable di(monohydroxyaryl) alkanes the aryl residues of which carry halogen atoms are, for instance, 2,2-(3,5,3',5'4,4'-dihydroxy-diphenyl) propane, 2,2-(3,5,3',5'4,4'-dihydroxy-diphenyl) propane, (3,3'-dichloro- 4,4'-dihydroxy-diphenyl) methane and 2,2'-dihydroxy-5,5'-difluoro-diphenyl methane. Suitable di(monohydroxyaryl) alkanes the alkyl residue of which linking the two benzene rings is substituted by an aryl residue are, for instance, (4,4'-dihydroxy-diphenyl) phenyl methane and 1,1-(4,4'-dihydroxy-diphenyl)-1-phenyl ethane.

In order to obtain special properties, mixtures of various di(monohydroxyaryl) alkanes can also be used, thus mixed polycarbonates are obtained.

The conversion of the aforesaid di(monohydroxyaryl) alkanes into high molecular polycarbonates by reacting with the mentioned derivates of the carbonic acid may be carried out as known in the art. For instance, the di(monohydroxyaryl) alkanes can be re-esterified with carbonic acid diesters, e.g., dimethyl-, diethyl-, dipropyl-, dibutyl-, diamyl-, dioctyl-, dicyclohexyl-, diphenyl- and di-O, p-tolyl carbonate at elevated temperatures from about 50° to about 320° C. and especially from about 120° to about 280° C.

The polycarbonates can also be produced by introducing phosgene into solutions of di(monohydroxyaryl) alkanes in organic bases, such as dimethylaniline, diethylaniline, trimethylamine and pyridine, or into solutions of di(monohydroxyaryl) alkanes in inert organic solvents, such as benzine, ligroine, cyclohexane, methylcyclohexane, benzene, toluene, xylene, chloroform, methylene chloride, carbon tetrachloride, trichloroethylene, dichloroethane, methylacetate, and ethylacetate, with the addition of an acid-binding agent as mentioned above.

A process particularly suitable for producing polycarbonates consists in introducing phosgene into the aqueous solution or suspension of alkali metal salts such as lithium-, sodium-, potassium- and calcium salts of the di(monohydroxyaryl) alkanes, preferably in the presence of an excess of a base such as lithium-, sodium-, potassium- and calcium hydroxide- or carbonate. The polycarbonate precipitates out from the aqueous solution.

The conversion in the aqueous solution is promoted by the addition of indifferent solvents of the kind mentioned above which are capable of dissolving phosgene and eventually the produced polycarbonate.

The phosgene may be used in an equivalent amount. Generally, however, it is preferable to use an excess of phosgene.

Finally, it is also possible to react the di(monohydroxyaryl) alkanes with about equimolecular amounts of bischloro carbonic acid esters of di(monohydroxyaryl) alkanes under corresponding conditions.

In the production of polycarbonates according to the various processes, it is advantageous to employ small amounts of reducing agents, for example, sodium-, or potassium-sulphide, -sulphite and dithionite or free phenol and p-tert.-butylphenol.

By adding monofunctional compounds which are capable of reacting with phosgene or with the end groups of the polycarbonates consisting of chlorocarbonic acid ester group and which terminate the chains, such as the phenols, for instance, the phenol, the tert.-butyl-phenol, the cyclohexylphenol, and 2,2-(4-hydroxyphenol-4'-methoxyphenyl) propane, further aniline and methylaniline, it is possible to regulate the molecular weight of the polycarbonates in wide limits.

The reaction of the di(monohydroxyaryl) alkanes with phosgene or of the chlorocarbonic esters of the di(monohydroxyaryl) alkanes may be carried out at room temperature or at lower or elevated temperatures, that is to say at temperatures from the freezing point to the boiling point of the mixture. (Column 1, line 31, to Column 3, line 1, of U.S. Pat. No. 3,028,365). The polycarbonate film preferably has a thickness of from about 5 to about 250 mils and most preferably from about 60 to about 100 mils. In some cases, it may be desirable to use copolymers of various dihydroxy aryl propanes in order to achieve special properties.

Other pellucid materials are disclosed in U.S. Pat. No. 3,069,301 at Column 1, lines 62-68, which are rigid and resistant to scratching and essentially non-hydroscopic.

According to the present invention, it is possible to laminate a fully polymerized sheet of polyurethane to glass and/or plastic in a manner similar to the commercial techniques formerly employed with plasticized polyvinyl butyral sheeting, namely, assembling a series of glass and plastic sheets in the order in which they are to be laminated, inserting the assembly in a thin bag of polyethylene plastic, closing and evacuating the loaded bag, and exposing the closed bag and its contents to an elevated temperature and pressure (such as 275° F. and 200 pounds per square inch) for sufficient time (about 30 minutes) to complete the laminating operation. Equipment used for previous commercial operations involving laminating multiplate panels of glass and polyvinyl butyral is still useful and need not be replaced with apparatus needed to form a cell of rigid sheets between which a partly polymerized polyurethane in a viscous liquid phase is cast to be polymerized in place.

The only new step required by the present invention, when used in the fabrication of multiplate bullet-resisting panels, is to apply a thin film of polyurethane in polymerizable, liquid form to the interfacial surfaces of the polymerized polyurethane sheet, one including a glass sheet surface and the other including a polycarbonate surface. It is also possible to improve the adhesion between the polymerized polyurethane sheet by applying a thin film of polymerizable, liquid polyurethane onto the glass or polycarbonate surface that faces the polymerized polyurethane sheet. While it is preferred to apply the A stage, polymerizable, liquid polyurethane by brushing or roll coating or spraying, for example, in the absence of a solvent, particularly when treating laminates having a polycarbonate layer, because most solvents attack polycarbonates, it is possible to use compositions of polymerizable polyurethane in certain solvents that do not attack either glass or polycarbonates, such as isopropyl alcohol, normal propanol, hexane and kerosene.

Various tests were performed to compare the adhesion of polymerized polyurethane to glass and to a polycarbonate sheet sold by General Electric under the trade name of LEXAN.

The drawing forms part of the description of an illustrative embodiment of the present invention and shows a partial cross section of a typical arrangement of a multi-plate assembly of glass and plastic plies used in tests described below to determine the benefits of the present invention. It is understood that penetration resistance of a glass-plastic laminate is generally increased by increasing the number of plies, particularly in the impact striking portion, so that the specific arrangement of the test samples may be modified by including $n$ layers of glass and $n-1$ layers of plasticized polyvinyl butyral resin arranged in alternate layers, where $n$ is any integer of 2 or more.

In the drawing, a bullet 10 is shown approaching a multiplate bullet-resisting panel. The latter comprises an outer sheet of glass 11 of three-eighth inch nominal thickness, followed by a layer of plasticized polyvinyl butyral 12, an additional sheet of glass 13, an additional layer of plasticized polyvinyl butyral 14 and an additional glass sheet 15. Glass sheets 13 and 15 are of one-fourth inch nominal thickness and the sheets of polyvinyl butyral 12 and 14 are 0.020 inch thick. The polyvinyl butyral layers 12 and 14 preferably have minimum moisture content to improve their adhesion to the glass sheets 11, 13 and 15, and have a relatively low plasticizer content equivalent to less than 25 parts by weight of triethylene glycol di(2-ethyl butyrate) per 100 parts of polyvinyl butyral. The glass sheets 11, 13 and 15 and the layers of plasticized polyvinyl butyral 12 and 14 comprise the impact striking portion 16 of the multiplate assembly.

A layer 20 of polymerized polyurethane 0.250 inch thick constitutes the impact transition portion of the multiplate assembly. It is understood that the term "cured" as recited herein refers to a material that may be either partially polymerized (B stage) or fully polymerized (C stage). Another layer 30 of rigid transparent plastic, such as a polycarbonate sold under the trade name of LEXAN by the General Electric Company of Schenectady, N.Y., serves as the impact absorption portion.

The gist of the present invention, as applied to a multiplate bullet-resistant assembly, is the application of a thin film 31 of polymerizable, A-stage polyurethane at the interface between the inner surface of the innermost glass sheet 15 and the bullet-facing surface of the polymerized polyurethane sheet 20 to improve the glass-polyurethane sheet adhesion and a similar film 32 of polymerizable, A-stage polyurethane at the interface between the inner surface of the B-stage polyurethane sheet 20 and the bullet-facing surface of the polycarbonate sheet 30 to improve the adhesion between the cured polyurethane sheet and the polycarbonate sheet.

In the first experiment, a B-stage polyurethane sheet provided by E. I. du Pont and Company, Wilmington, Del., under the trade name Du Pont LRP–269 sheet, was assembled between a sheet of glass and a sheet of polycarbonate to form a laminated assembly 6 inches square that served as a control sample. Other assemblies were formed of the same size and the same materials except for one of the following treatments with an A-stage liquid polyurethane. The latter polyurethane was formed by mixing 20 parts by weight of toluene diisocyanate with 80 parts by weight of 1,4 polyoxybutylene glycol to form 100 parts by weight of a resin containing 15 parts by weight of isocyanate. This product in turn was mixed with a mixture containing 13.78 parts by weight of butanediol and 2.28 parts by weight of trimethylol propane in a vacuum at 100° F. for sufficient time to form a polymerizable, liquid A-stage polyurethane resin. The liquid resin was applied to the glass surface and the polycarbonate surface that faced the polyurethane sheet of certain test samples or on the glass surface and polyurethane surface that faced the polycarbonate sheet on other test samples or on the polycarbonate surface and the polyurethane surface facing the glass sheet of still other test samples. Other test samples were treated with compositions containing liquid polyurethane as described above mixed with equal parts by weight of one of the organic solvents taken from the class consisting of isopropanol, hexane and normal propanol. Each control sample or test sample was inserted in a polyethylene bag with the exposed polycarbonate surface backed up by a glass sheet and separated therefrom by a parting sheet of Mylar (the trade name for polyethylene glycol terephthalate) and the plies taped together using Scotch tape. The surfaces treated with the mixed compositions were allowed to stand to permit the organic solvent to evaporate before these panels were assembled. The bags were then loaded with an assembled panel, closed, evacuated and then exposed for 30 minutes to a temperature of 275° F. and a pressure of 200 pounds per square inch. Examination of the assemblies after untaping and removing the Mylar and backing glass sheet from each assembly showed no adhesion of the LRP–269 to the glass and slight adhesion to the polycarbonate in the control assembly that was not treated at its polyurethane facing surfaces. The other test assemblies displayed good adhesion of the polyurethane sheets to both the glass sheet and to the polycarbonate sheet.

The test was repeated using a polyurethane material containing the basic ingredients for the polyurethane composition applied to the interfacial compositions as described above, except that the polyurethane sheet so produced was polymerized for 6 hours at 285° F. in a sealed system between a pair of glass sheets, using sheets of polytetrafluoroethylene sold under the trade name of Teflon as a parting material. Some assemblies formed of glass, polymerized polyurethane and polycarbonate had the polymerizable, liquid polyurethane or mixture of liquid polyurethane and one of the above-mentioned organic solvents applied only to the glass-polyurethane interface, and other assemblies had both polyurethane facing surfaces treated by applying the polymerizable, liquid polyurethane or the aforesaid mixtures before the assemblies were laminated in a closed plastic bag as before. The first group of laminated assemblies exhibited good adhesion between the glass and the cured polyurethane interlayer but poor adhesion between the cured polyurethane and the polycarbonate. The second group of laminated assemblies exhibited good adhesion of the polymerized polyurethane to both the glass and to the polycarbonate.

Additional tests were performed on multiplate laminates containing an impact striking portion comprising three glass sheets, the outermost one three-eighths inch thick and the other two one-fourth inch thick each alternating with two sheets of plasticized polyvinyl butyral 0.020 inch thick each. All of these multiplate laminates had an innermost layer of one-eighth inch thick polycarbonate sheet serving as the impact absorption portion. All of the multiplate laminates had an impact transition portion of polyurethane in the form of a B-stage sheet one-fourth inch thick.

The first ballistic test involved comparing multiplate laminates containing du Pont's LRP–269 B-stage polyurethane one-eighth inch thick with no interfacial polymerizable A-stage polyurethane application, compared to a similar laminate in which the B-stage polyurethane sheet facing surfaces of the glass and the polycarbonate were treated with the aforesaid polymerizable, liquid polyurethane and said mixtures containing said organic solvents. The polycarbonate sheet was blown off the back of the laminates during ballistic testing of the laminate that did not have the polymerizable, liquid polyurethane or mixed composition treatment. The panels laminated with the treated interfaces showed good adhesion and ballistic impact results comparable to those obtained from laminates containing a cast-in-place polyurethane layer of the A-stage polyurethane polymerized in place to form the impact transition portion and with better optical properties.

A second ballistic test was performed comparing laminates having a B-stage polyurethane layer produced by polymerizing the aforesaid A-stage polyurethane to form a sheet used as the impact transition portion with and without said polyurethane liquid or mixture treatment as described above and with laminates having the cast-in-place polyurethane interlayer recited above as the impact transition portion. While specific values of ballistic results are classified, ballistic results for those samples containing a sheet of polymerized polyurethane and the liquid polyurethane or the liquid polyurethane-organic solvent mixture described above on both the glass and polycarbonate surfaces facing the polymerized polyurethane sheet were not significantly different from those obtained using a cast-in-place polyurethane interlayer and 15 percent better than multiplate laminates having no polymerizable polyurethane liquid film.

Additional adhesion tests were performed to evaluate the ability of the polymerizable, A-stage liquid polyurethane to adhere polymerized, C-stage sheets of polyurethane to glass and to polycarbonate sheets. The results of the comparisons were even more dramatic than the results obtained from the experiments performed to adhere B-stage polyurethane sheets. This result was attributed to the fact that a C-stage polyurethane sheet has poorer adhesion directly to glass or a polycarbonate sheet than a B-stage polyurethane sheet.

While in theory any pair of interfacial surfaces may be treated with the polyurethane or mixture of polyurethane and organic solvent of the type that does not impair polycarbonate sheets, it is impractical to handle B-stage or C-stage polyurethane sheets treated on both surfaces. Therefore, it is suggested that the glass sheet to be assembled next to the polyurethane sheet be treated on its polyurethane sheet facing surface and that the polyurethane sheet be treated on its surface that faces the polycarbonate sheet and that the panel to be assembled be oriented so that the treated surfaces face upward. However, it is permissable to treat both the glass and polycarbonate sheet surfaces that face the polyurethane sheet or either the glass or polycarbonate sheet and a surface of the polyurethane sheet that would face an untreated surface of the glass or polycarbonate.

We claim:

1. A method of adhering a thermoset, polymerized sheet of polyurethane that is solid in appearance and difficult to adhere to glass or polycarbonate, to a rigid transparent sheet of glass or polycarbonate comprising applying a thin film of polymerizable A-stage polyurethane in liquid form to an interfacial surface between said sheets immediately prior to assembling said sheets for immediate lamination at elevated temperature and pressure.

2. A method as in claim 1, wherein said polymerizable polyurethane is applied as a thin film of A-stage polyurethane in liquid form in a volatile solvent.

3. A method as in claim 1, wherein said rigid, transparent sheet is a polycarbonate.

4. A method as in claim 1, wherein said rigid, transparent sheet is glass.

5. A method as in claim 4, wherein said glass is tempered.

6. A method as in claim 5, wherein said glass is chemically tempered.

7. A method as in claim 1, wherein said sheet of polyurethane is adhered to another rigid, transparent sheet of glass or polycarbonate on its other side comprising applying to said other interfacial surface a thin film of said A-stage, liquid polymerizable polyurethane.

8. A method as in claim 7, wherein one of said rigid sheets is glass and the other of said rigid sheets is a polycarbonate.

9. A method as in claim 8, wherein said liquid, A-stage polyurethane is applied in a mixture in an organic solvent that does not attack said polycarbonate or glass sheets.

10. A transparent laminated glass-plastic assembly comprising a transparent sheet of polyurethane that is solid in appearance intermediate a transparent sheet of glass and a transparent sheet of polycarbonate characterized by a thin film of polyurethane applied in the liquid, polymerizable state (A stage) at an interfacial surface between said glass sheet and said sheet of polyurethane and another thin film of polyurethane applied in the liquid, polymerizable state (A stage) at an interfacial surface between said polycarbonate sheet and said sheet of polyurethane.

11. A transparent laminated glass-plastic article comprising a series of alternate transparent plies of glass and of one or the other of a plastic taken from the class consisting of plasticized polyvinyl butyral and polyurethane, at least one of said plastic plies being a sheet of polyurethane that is solid in appearance and adhered to an adjacent of said glass sheets by a thin film of polyurethane applied in the liquid, polymerizable state (A-stage) at an interfacial surface between said adjacent glass sheet and said ply of polyurethane.

12. An article as in claim 11, wherein a transparent polycarbonate sheet is substituted for said adjacent glass sheet.

* * * * *